(12) United States Patent
Huang et al.

(10) Patent No.: US 10,314,000 B2
(45) Date of Patent: Jun. 4, 2019

(54) METHOD, APPARATUS AND SYSTEM FOR MEASURING A POSITION OF A USER EQUIPMENT IN A WIRELESS NETWORK

(71) Applicant: Intel IP Corporation, Santa Clara, CA (US)

(72) Inventors: Rui Huang, Beijing (CN); Yang Tang, Pleasanton, CA (US)

(73) Assignee: Intel IP Corporation, Santa Clara, CA (US)

( * ) Notice: Subject to any disclaimer, the term of this patent is extended or adjusted under 35 U.S.C. 154(b) by 171 days.

(21) Appl. No.: 15/125,561

(22) PCT Filed: Dec. 23, 2014

(86) PCT No.: PCT/US2014/072166
§ 371 (c)(1),
(2) Date: Sep. 12, 2016

(87) PCT Pub. No.: WO2016/167617
PCT Pub. Date: Nov. 5, 2015

(65) Prior Publication Data
US 2017/0223655 A1  Aug. 3, 2017

Related U.S. Application Data

(60) Provisional application No. 61/985,338, filed on Apr. 28, 2014.

(51) Int. Cl.
*H04W 24/00* (2009.01)
*H04W 64/00* (2009.01)
(Continued)

(52) U.S. Cl.
CPC ........... *H04W 64/00* (2013.01); *H04L 5/0048* (2013.01); *H04W 76/27* (2018.02); *H04W 84/04* (2013.01); *H04W 84/12* (2013.01); *H04W 88/02* (2013.01)

(58) Field of Classification Search
CPC ..... G01S 5/14; H04L 29/08657; H04W 64/00
See application file for complete search history.

(56) References Cited

U.S. PATENT DOCUMENTS 7,158,797 B1   1/2007  Jayaraman et al.
8,744,487 B2 *  6/2014  Jovicic .................. G01S 5/0081
                                                                455/41.2
(Continued)

FOREIGN PATENT DOCUMENTS

JP   2005-027108 A    1/2005
JP   2005537690 A    12/2005
(Continued)

OTHER PUBLICATIONS

International Search Report and Written Opinion dated Mar. 30, 2015 from International Application No. PCT/US2014/072166, 10 pages.

(Continued)

*Primary Examiner* — Shantell L Heiber
(74) *Attorney, Agent, or Firm* — Schwabe, Williamson & Wyatt, P.C.

(57) ABSTRACT

A device, method and system of measuring a position of a user equipment in a wireless network may be disclosed. In some embodiments, a target user device may comprise a communication module to receive a first message from a device in the wireless network, wherein the first message includes position information related to one or more anchor UEs; transmit a second message to the anchor UEs in the wireless network, wherein the second message includes an inquiry about whether a position of at least one of the anchor UEs is knowable to the target UE; and receive a third message from the at least one anchor UE, wherein the third (Continued)

message includes a response to the inquiry indicating that the position of the at least one anchor UE is knowable to the target UE.

19 Claims, 5 Drawing Sheets

(51) Int. Cl.
*H04W 76/27* (2018.01)
*H04L 5/00* (2006.01)
*H04W 84/04* (2009.01)
*H04W 84/12* (2009.01)
*H04W 88/02* (2009.01)

(56) References Cited

U.S. PATENT DOCUMENTS

| | | | |
|---|---|---|---|
| 2007/0159986 | A1 | 7/2007 | Park et al. |
| 2010/0265140 | A1 | 10/2010 | Sohn |
| 2011/0190004 | A1* | 8/2011 | Tenny .................. H04W 4/02 455/456.1 |
| 2012/0122485 | A1* | 5/2012 | Bartlett ................ G01S 5/0284 455/456.1 |
| 2013/0324114 | A1* | 12/2013 | Raghothaman ..... H04W 76/023 455/426.1 |
| 2014/0073356 | A1 | 3/2014 | Siomina et al. |
| 2014/0162544 | A1* | 6/2014 | Edge .................... H04W 8/005 455/3.01 |
| 2014/0204847 | A1* | 7/2014 | Belleschi ............ H04W 76/023 370/329 |
| 2014/0235266 | A1* | 8/2014 | Edge .................... H04W 64/00 455/456.1 |
| 2016/0007372 | A1* | 1/2016 | Fujishiro ............... H04W 8/005 370/329 |

FOREIGN PATENT DOCUMENTS

| | | |
|---|---|---|
| JP | 2010-230380 A | 10/2010 |
| JP | 2012005119 A | 1/2012 |
| KR | 10-2012-0003716 A | 1/2012 |

OTHER PUBLICATIONS

Notice of Preliminary Rejection dated Jun. 20, 2017 from Korean Patent Application No. 2016-7026692, 4 pages.
Notice of Reasons for Rejection dated Nov. 7, 2017 from Japanese Patent Application No. 2017-502573, 4 pages.
Extended European Search Report dated Dec. 1, 2017 from European Patent Application No. 14890577.1, 13 pages.
"3GPP, ""Technical Specification Group Radio Access Network; Evolved Universal Terrestrial Radio Access Network (E-UTRAN); Stage 2 functional specification of User Equipment (UE) positioning in E-UTRAN(Release 12),""" 3GPP TS 36.305 V12.0.0 (Dec. 2013), Jan. 7, 2014, Lte Advanced, 59 pages".
3GPP, "Technical Specification Group Radio Access Network; Evolved Universal Terrestrial Radio Access (E-UTRA); Radio Resource Control (RRC); Protocol specification (Release 12)," 3GPP TS 36.331 V12.1.0 (Mar. 2014), Mar. 19, 2014, Lte Advanced, 356 pages.
3GPP, "Technical Specification Group Radio Access Network; Evolved Universal Terrestrial Radio Access (E-UTRA); Requirements for support of radio resource management (Release 12)," 3GPP TS 36.133 V12.3.0 (Mar. 2014), Mar. 27, 2014, 820 pages.
3GPP, "Technical Specification Group Radio Access Network; Evolved Universal Terrestrial Radio Access (E-UTRA); LTE Positioning Protocol (LPP) (Release 12)," 3GPP TS 36.355 V12.1.0 (Mar. 2014), Mar. 19, 2014, Lte Advanced, 126 pages.
Japanese Patent Office—Decision to Refuse dated Jun. 5, 2018 from Japanese Patent Application No. 2017-502573, 6 pages.

* cited by examiner

METHOD, APPARATUS AND SYSTEM FOR MEASURING A POSITION OF A USER EQUIPMENT IN A WIRELESS NETWORK

CROSS REFERENCE TO RELATED APPLICATIONS

The present application is a national phase entry under 35 U.S.C. § 371 of International Application No. PCT/US/2014/072166, filed Dec. 23, 2014, entitled "METHOD, APPARATUS AND SYSTEM FOR MEASURING A POSITION OF A USER EQUIPMENT IN A WIRELESS NETWORK", which claims priority to U.S. Provisional Patent Application No. 61/985,338, filed Apr. 28, 2014, the entire disclosures of which are hereby incorporated by reference in their entireties for all purposes, except for those sections, if any, that are inconsistent with the specification.

BACKGROUND INFORMATION

Several user equipment (UE) positioning methods may be supported under current Long Term Evolution (LTE) standards of 3rd Generation Partnership Project along with any amendments, updates and/or revisions, such as LTE Rel 10 or 11. Examples of the positioning methods may include a global navigation satellite system (AGNSS), an observed time difference of arrival (OTDOA), Enhanced Cell-Identifier (Cell-ID).

For example, based on the OTDOA method, the UE may measure transmission time difference for a signal transmission from the UE to multiple evolved NodeBs (eNBs), e.g., three or more eNBs. Based on the measured transmission time difference and the position information related to the multiple eNBs, the position of the UE may be calculated.

BRIEF DESCRIPTION OF THE DRAWINGS

Embodiments of the invention are illustrated by way of example, and not by way of limitation, in the figures of the accompanying drawings in which like reference numerals refer to similar elements.

DESCRIPTION OF THE EMBODIMENTS

Illustrative embodiments of the present disclosure include, but are not limited to, methods, systems, and apparatuses for handling in-device coexistence interference in a wireless network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a programmable logic, a processor (shared, dedicated, or group) and/or memory (shared, dedicated, or group) that execute one or more software or firmware programs, a combinational logic circuit, and/or other suitable components that provide the described functionality.

Figure 1:
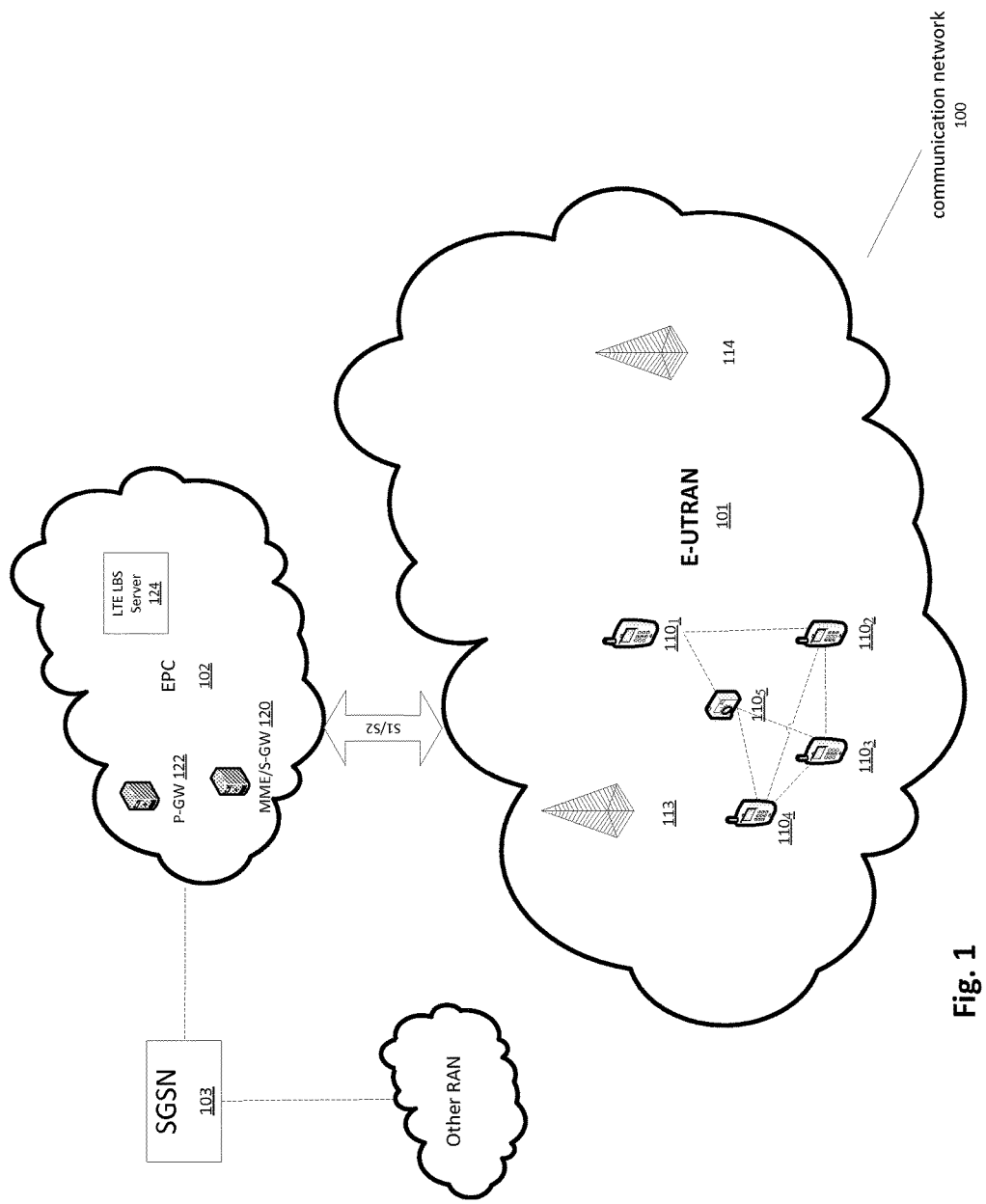
FIG. 1 schematically illustrates an embodiment of a user device to device (D2D) network in compliance with the 3GPP LTE architecture in accordance with various embodiments.

FIG. 1 schematically illustrates an embodiment of a user device to device (D2D) wireless communication network 100 in accordance with various embodiments. The D2D communication may refer to a kind of direct communication between the UEs being positioned in proximity with each other by sharing cell resources of the wireless communication network 100, especially, in compliance with the Long Term Evolution (LTE) standards of 3rd Generation Partnership Project along with any amendments, updates and/or revisions.

As illustrated, the wireless communication network 100 may comprise an Evolved Universal Terrestrial Radio Access Network (E-UTRAN) 101, an Evolved Packet Core (EPC) 102, a Serving GPRS Support Node (SGSN) 103, and/or others.

In various embodiments, the E-UTRAN 101 may comprise a plurality of user equipments (UEs) $112_1$-$112_5$ configured to operate under the 3GPP LTE architecture and/or under a wireless local access networks (WLAN) architecture, a serving evolved NodeB (eNB) 113 connecting the UEs $112_1$-$112_5$ with the EPC 102, and/or others. The EPC 102 may further comprise a plurality of servers, such as a Mobility Management Entity/Serving-Gateway (MME/S-GW) 120, a Packet Data Network (PDN) Gateway (P-GW) 122, a LTE location base server (LTE LBS server) 124, and/or others. In an embodiment, the LBS server 124 may communicate with any of the UEs $102_1$-$102_5$ via an interface (such as a S1/S2 interface for the LTE implementation or a 802.11 interface for the WLAN implementation) for location positioning purposes whose details would be provided later.

In accordance with various embodiments, the UEs $102_1$-$102_5$ may be embodied as, without limitation, a smart phone, a cellular telephone, a tablet, a consumer electronic device, a laptop computer, a notebook computer, a mobile computing system, a processor-based system, and/or any other mobile communication device configured to measure its position with use of positioning assistance data from a device, such as the LBS server 124.

It should be understood that other embodiments may implement other technologies for the wireless communication network 100. For example, the E-UTRAN 101 may comprise more than one eNB, such as a neighboring eNB 114.

Figure 2:
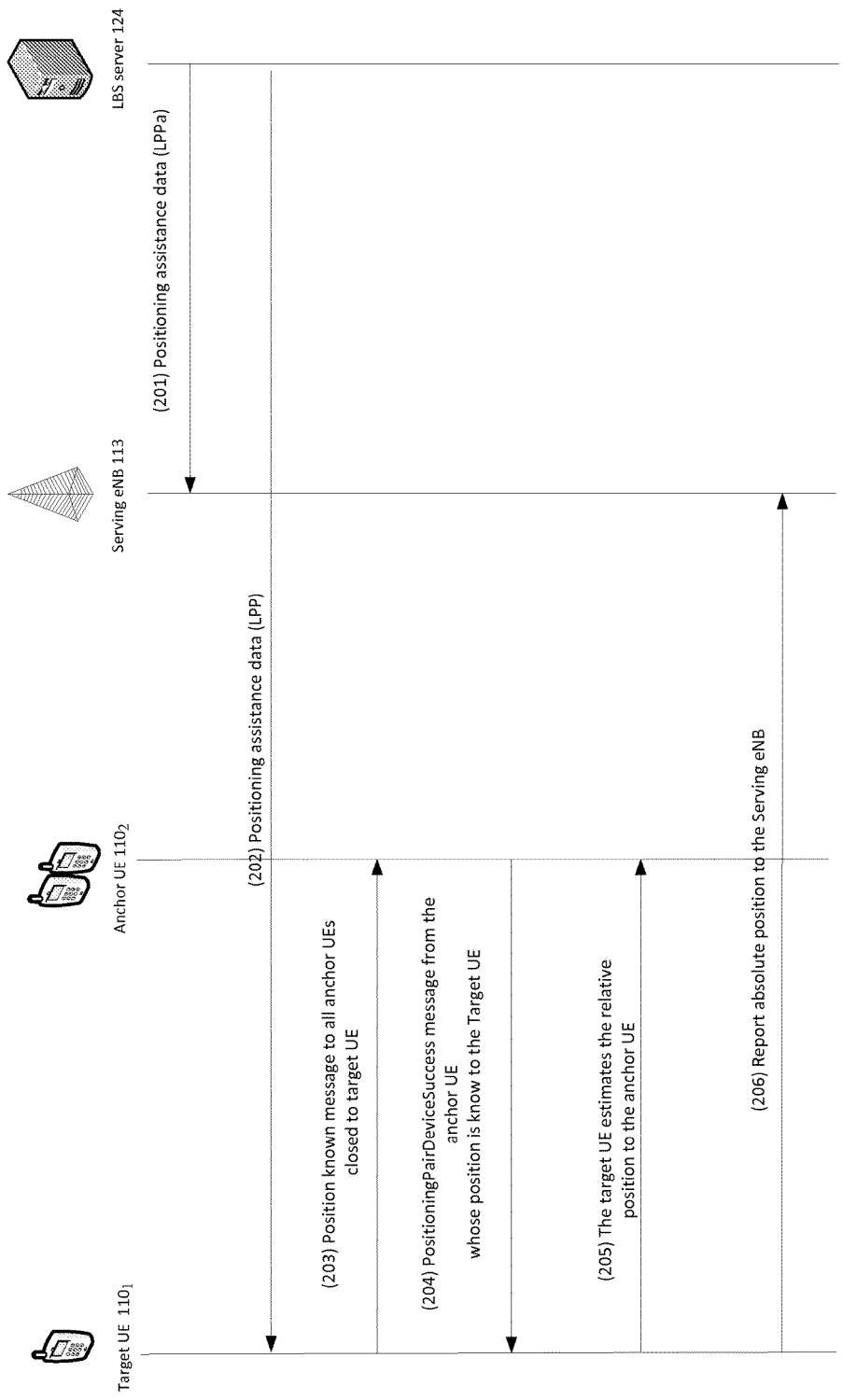
FIG. 2 schematically illustrates an embodiment of a signaling procedure for a D2D positioning method under the D2D network in accordance with various embodiments.

FIG. 2 schematically illustrates an embodiment of a signaling procedure for a D2D positioning method under the wireless communication network 100 in accordance with various embodiments.

In some embodiments, an UE of the UEs $110_1$-$110_5$ may be referred as a target UE (such as UE $110_1$), which may be configured to measure its position through a known position of another UE of the UEs $110_1$-$110_5$ (such as UE $110_2$), and other IEs which may help the LBS server 124 or the serving eNB 113 to locate the anchor UE $110_2$-$110_5$, e.g., finding the position of the anchor UE $110_2$ through using the position indication of the PhysCellId and the deviceID as an index.

The positioning assistance data may further comprise information elements (IEs), such as a positioning reference signal type (PrsType) which may specify whether the type of the positioning reference signal (e.g., the PhysCellId and deviceID) is feasible for the positioning measurement between the target device and an anchor UE (such as the anchor UE $110_2$), for example, feasible for a D2D positioning measurement and/or for a cellular positioning measurement. In some embodiments, the anchor UEs $110_2$-$110_5$ may locate in the same serving cell as the target UE $110_1$. In other embodiments, the anchor UEs $110_2$-$110_5$ may locate in a different serving cell as the target UE $110_1$.

In some embodiments, the positioning assistance data may be embodied as a d2d-positioning-anchor-list having the IEs as stated in the above. In other embodiments, the positioning assistance data may include multiple d2d-positioning-anchor-lists, each d2d-positioning-anchor-list may correspond to each anchor UE. For example, a d2d-positioning-anchor-list may comprise a deviceID of an anchor UE, a physCellId and a PrsType related to the anchor UE. In this way, the positioning assistance data may match the anchor UE with the positioning related information (e.g., phyCellId, deviceIDList, prsType, etc.). Example of the d2d-positioning-anchor-list may be embedded into LTE standard TS 36.355, section 6.5.1.1 and provided as in the below:

```
--ASNISTART
d2d-positioning-anchor-list::=SEQUENCE {
    physCellId          INTEGER (0...503)}
    deviceIDList        ENUMERATED
    prsType             ENUMBERATED        OPTIONAL,    --Cond PRS
    ...,
}
--ASNISTOP
``` which may be provided by the LBS server 124. Hereinafter, the UE $110_2$-$110_5$ may be referred as anchor UEs, if their positions are known to the LBS server 124. It should be understood that other embodiments may implement other technologies for the target UE $110_1$ or the anchor UE $110_2$. For example, the target UE $110_1$ and/or the anchor UE $110_2$ may be configured to measure its position. For another example, the position information may be obtained from other devices than the LBS server 124, such as from the serving eNB 113 and/or the neighboring eNB 114. More details may be provided below.

In some embodiments, the LBS server 124 may transmit a LTE positioning protocol A (LPPa) message including positioning assistance data to the serving eNB 113 (signaling 201). The LPPa message may be transmitted via a radio resource control (RRC) connection. In some embodiments, the positioning assistance data may provide position information related to the anchor UEs $110_2$-$110_5$ which may be known to the LBS server 124, and/or other devices such as the serving eNB 113. In some embodiments, the position information may include a position indication of the anchor UE $110_2$-$110_5$ having various information elements (IEs), for example, but not limited to, a physical cell identifier (PhysCellId) for a serving cell where the anchor eNB may be located, a device identifier (deviceID) of the anchor eNB, The LBS server 124 may further transmit a location positioning protocol (LPP) message to the target UE $110_1$ through a RRC connection (signaling 202), which message may include the similar or same positioning assistance data as stated with respect to the signaling 201. In response to the LPP message, the target UE $110_1$ may transmit a request message to the anchor UEs $110_2$-$110_5$ through a RRC connection (signaling 203), which message may inquire the anchor UEs $110_2$-$110_5$ about whether their position information may be known to the target UE $110_1$. For example, the message may be embodied as an "Position-Known" message having an IE of an inquiry about whether it is true to know the absolute position of the anchor UE $110_2$. Example of the "Position-Known" message may be embedded into LTE standard TS 36.355, section 6.5.1.1 and included the below:

```
--ASNISTART
eNB PositionKnown::=SEQUENCE {
    isTrue                          OPTIONAL,--
    ...,
}
--ASNISTOP
```

In some embodiments, in response to the request message as stated above, one of the anchor UEs $110_2$-$110_5$ (e.g., anchor UE 110₂) may determine that its position message is knowable to the target UE 110₁ based on various factors especially including security, and send a response to the target UE 110₁ via the RRC connection (signaling 204). The response message may include position information related to the anchor UE 110₂, such as the deviceID of the anchor UE 110₂, PrsType specifying the position reference signal type which is feasible for the positioning measurement between the target UE and the anchor UE (such as D2D measurement, cellular measurement, etc.), and/or others. In some embodiments, the anchor UE 110₂ may further include the PhysCellId for the serving cell where the anchor UE 110₂ is located into its response message (i.e., signaling 204), which may help the target UE 110₁ to omit the work of retrieve the PhysCellId from the Example of the "PositioningPairDeviceSuccess" message may be embedded into LTE standard TS 36.355, section 6.5.1.1 and include the below:

```
- -ASN1START
positioningPairDeviceSuccess::=SEQUENCE{
    device              INTEGER (0 ...503)
    prs Type            ENUMERATED     OPTIONAL, -- Cond
                                       PRS
    ...,
}
- -ASN1START
```

In some embodiments, the target UE 110₁ may retrieve position information related to the anchor UE 110₂ based on the response received from the anchor UE 110₂. For example, the target UE 110₁ may retrieve, from the d2d-position-anchor-list corresponding to the deviceID received from the anchor UE 110₂, the physCellId for the serving cell where the anchor UE 110₂ may be located. Alternatively, the anchor UE 110₂ may include the physCellId in its response to the target UE 110₁, so that the target UE 110₁ may not need to retrieve the PhysCellId from its d2d-position-anchor-list.

In some embodiments, the target UE 110₁ may estimate a delta position for the target UE 110₁ with respect to the anchor UE 110₂ by other means besides LTE, such as light focus method and sonar. For implementation, the target UE 110₁ may estimate the distance between the target UE 110₁ and the anchor UE 110₂ based on the measurement of round trip time for a sonar wave or a light wave to the anchor UE 110₂.

In some embodiments, the target UE 110₁ may generate its position information based on the position information related to the anchor UE 110₁ (i.e., the position indication including the PhysCellId and the deviceID) and the delta position for the target UE 110₁ with respect to the anchor UE 110₂. The target UE 110₁ may further report its position information to the serving eNB 113 and the LBS server 124 (signaling 206) via the RRC connection, so that the serving eNB 113 and/or the LBS server 124 may calculate the position of the target UE 110₁ by adding the position of anchor UE 110₂ obtained through using the position indication of the anchor UE 110₂ as an index to the delta position between the target UE 110₁ and the anchor UE 110₂.

Figure 3:
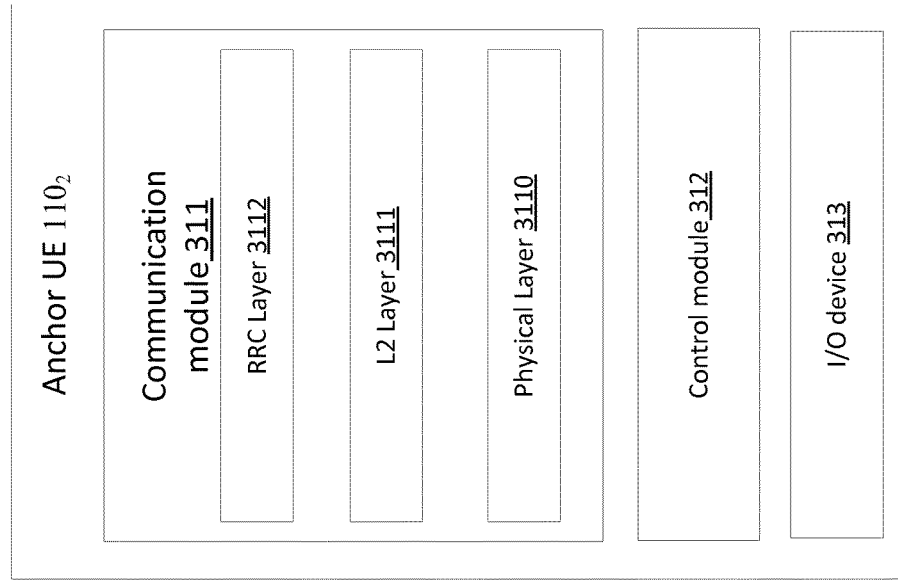
FIG. 3 schematically illustrates an embodiment of an environment for measuring a position of a target UE with positioning assistance data related to an anchor UE, in accordance with various embodiments.
Figure 3:
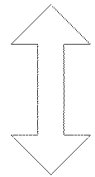
Figure 3:
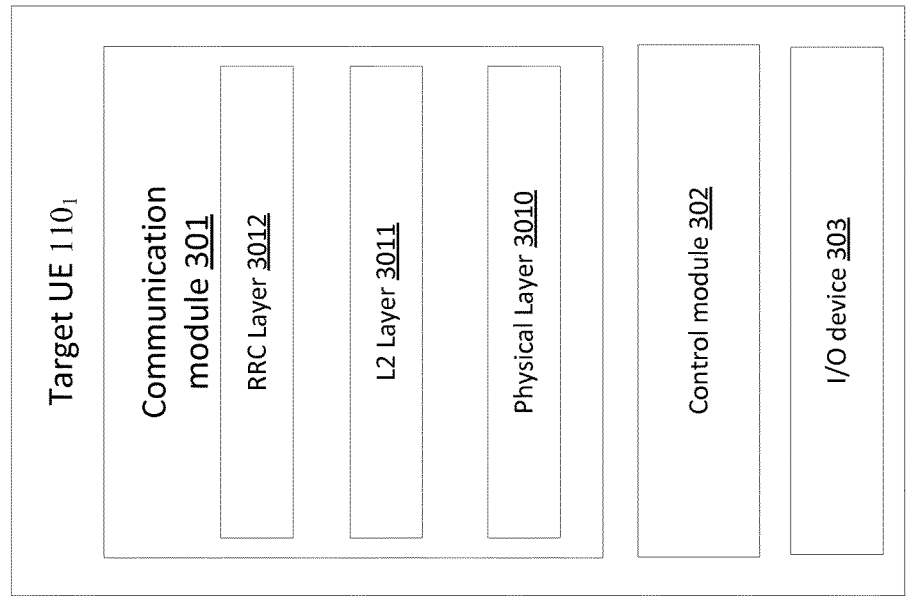

FIG. 3 schematically illustrates an embodiment of an environment for measuring a position of a target UE 110₁ with positioning assistance data related to an anchor UE 110₂, in accordance with various embodiments. As shown in FIG. 3, the target UE 110₁ may communicate with the anchor UE 110₂ via a wireless communication network in compliance with the 3GPP LTE standards along with any amendments, updates and/or revisions, or WLAN standards.

In some embodiments, the target UE 110₁ may include a communication module 301, a control module 302, an Input/Output (I/O) device 303, and/or others. The anchor UE 310 may include a communication module 311, a control module 312, an I/O device 313, and/or others. The communication module 301 of the target UE 110₁ may receive or transmit information from or to the communication module 311 of the anchor UE 110₂, such as the signaling 203-205. The communication module 301 of the target UE 110₁ may further comprise several layer implementations, such as a physical layer 3010, a L2 layer 3011, a RRC layer 3012 and other layers. Similarly, the communication module 311 of the anchor UE 110₂ may include several layer implementations, such as a physical layer 3110, a L2 layer 3111, a RRC layer 3112, and other layers. More particularly, the RRC layer 3012 of the target UE 110₁ may receive a LLP message (signaling 201) including the positioning assistance data from the LBS 124 via the RRC connection. The RRC layer 3012 may further transmit and receive the signaling 203-204 to and from the RRC layer 3112. The I/O 303 device may include peripheral component devices, such as a microphone or a camera, which may be capable to implement a delta position measurement between the target UE 110₁ and the anchor UE 110₂ via a light focus method and/or sonar. The control module 302 may collect the position information related to the anchor UE 110₂ from the communication module 301 such as the PhysCellId and deviceID and the delta positioning data from the I/O device 303 measured via the method such as light focus method and sonar. The control module 302 may further generate its position report based on the position information related to the anchor UE 110₂ (e.g., the position indication including the PhysCellId and the deviceID) and the delta position for the target UE 110₁ with respect to the anchor UE 110₂, and the RRC layer 3012 may further transmit the position report to the serving eNB 113. The position report for the target UE 110₁ may help the serving eNB 113 and/or LBS sever 124 to obtain the position of the target UE 110₁ by adding the position of anchor UE 110₂ to the delta position between the target UE 110₁ and the anchor UE 110₂.

However, it should be understood that other embodiments may implement other technologies for the target UE 110₁ or the anchor UE 110₂. For example, it may be other layers rather than the RRC layer 3012 of the target UE 110₁ to receive or transmit signaling and data from or to the anchor UE 110₂. Similarly, it may be other layers rather than the RRC layer 3112 of the anchor UE 110₂ to receive or transmit signaling and data from or to the target UE 110₁.

Figure 4:
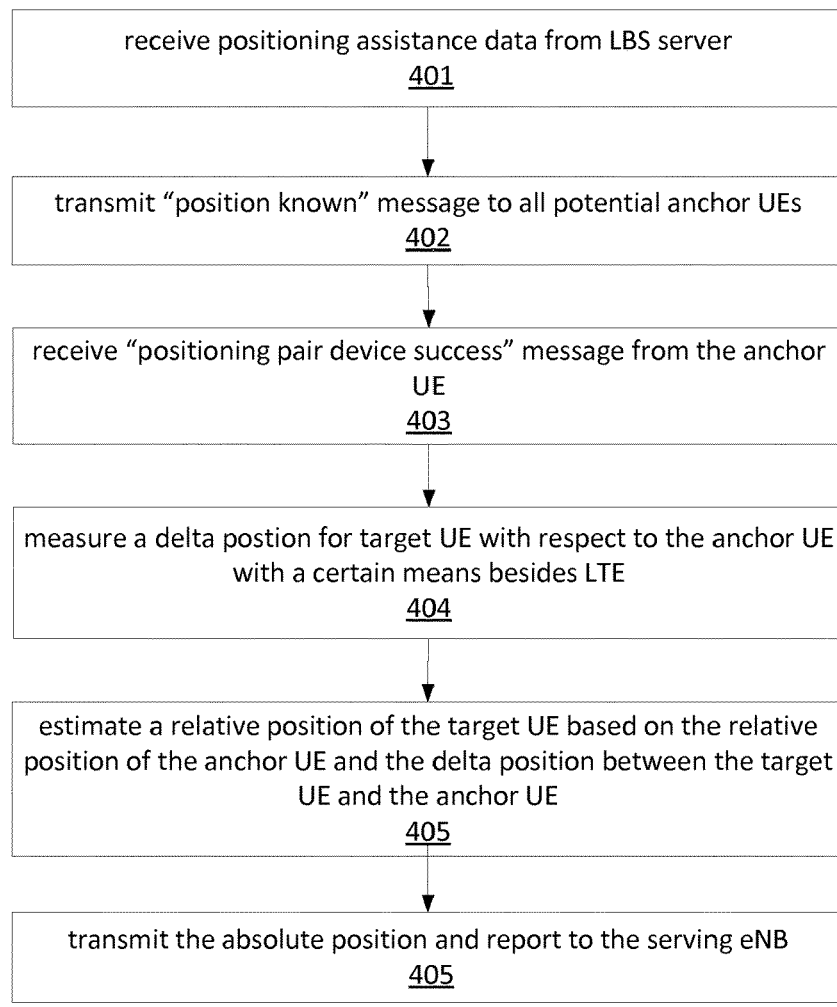
FIG. 4 schematically illustrates a method of measuring the position of the target UE implemented by the target UE, in accordance with various embodiments.

FIG. 4 schematically illustrates a method of measuring the position of the target UE implemented by the target UE, in accordance with various embodiments. In block 401, the communication module 301 or other devices of target UE 110₁ may receive the LPP message including the positioning assistance data from the target UE 110₁ via the RRC connection. In some embodiments, the positioning assistance data may provide position information related to the anchor UEs $110_2$-$110_5$, e.g., the position indication of the anchor UEs $110_2$-$110_5$ which are known to the LBS server 124, and/or other devices such as the serving eNB 113. The position indication of the anchor UE $110_2$-$110_5$ may include various information elements (IEs), for example, but not limited to, a physical cell identifier (PhysCellId) for a serving cell where the anchor eNB may be located, a device identifier (deviceID) of the anchor eNB, and other IEs which may help the LBS server 124 or the serving eNB 113 to locate the anchor UE $110_2$-$110_5$, e.g., finding the position of the anchor UE $110_2$ through using the position indication of the corresponding PhysCellId and the deviceID as an index.

The positioning assistance data may further comprise information elements (IEs), such as a positioning reference signal type (PrsType) which may specify whether the type of the positioning reference signal (e.g., the PhysCellId and deviceID) (correct?) is feasible for the positioning measurement between the target device and an anchor UE (such as the anchor UE $110_2$), for example, feasible for a D2D positioning measurement and/or for a cellular positioning measurement. In some embodiments, the anchor UEs $110_2$-$110_5$ may locate in the same serving cell as the target UE $110_1$. In other embodiments, the anchor UEs $110_2$-$110_5$ may locate in a different serving cell as the target UE $110_1$.

In some embodiments, the positioning assistance data may be embodied as a d2d-positioning-anchor-list having the IEs as stated in the above. In other embodiments, the positioning assistance data may include multiple d2d-positioning-anchor-lists, each d2d-positioning-anchor-list may correspond to each anchor UE. For example, a d2d-positioning-anchor-list may comprise a deviceID of an anchor UE, a physCellId and a PrsType related to the anchor UE. In this way, the positioning assistance data may match the anchor UE with the positioning related information (e.g., phyCellId, deviceIDList, prsType, etc.). Example of the d2d-positioning-anchor-list may be embedded into LTE standard TS 36.355, section 6.5.1.1 and provided as in the below:

```
--ASN1START
d2d-positioning-anchor-list::=SEQUENCE {
    physCellId          INTEGER (0...503)}
    deviceIDList        ENUMERATED
    prsType             ENUMBERATED        OPTIONAL,   --Cond PRS
    ...,
}
--ASN1STOP
```

In block 402, the communication module 301 or other device of UE $110_1$ may transmit a request message to the anchor UEs $110_2$-$110_5$ through a RRC connection (signaling 203), which message may inquire the anchor UEs $110_2$-$110_5$ about whether their position information may be known to the target UE $110_1$. For example, the message may be embodied as an "Position-Known" message having an IE of an inquiry about whether it is true to know the position information of the anchor UE $110_2$. Example of the "Position-Known" message may be embedded into LTE standard TS 36.355, section 6.5.1.1 and included the below:

```
--ASN1START
eNB PositionKnown::=SEQUENCE {
    isTrue                          OPTIONAL,--
    ...,
}
--ASN1STOP
```

In block 403, the communication module 301 or other device of the target UE $110_1$ may receive a response from one of the anchor UEs $110_2$-$110_5$ (e.g., anchor UE $110_2$) which may determine that its positioning message is knowable to the target UE $110_1$. In some embodiments, the anchor UE $110_2$ may determine that its positioning message is knowable to the target UE $110_1$ based on various factors especially including security. The response message may include position information related to the anchor UE $110_2$, such as the deviceID of the anchor UE $110_2$, prsType specifying the positioning reference signal type which is feasible for the positioning measurement between the target UE and the anchor UE (such as D2D measurement, cellular measurement, etc.), and/or others.

In some embodiments, the target UE $110_1$ may retrieve position information related to the anchor UE $110_2$ based on the response received from the anchor UE $110_2$. For example, the target UE $110_1$ may retrieve, from the d2d-position-anchor-list corresponding to the deviceID received from the anchor UE $110_2$, the physCellId for the serving cell where the anchor UE $110_2$ may be located. Alternatively, the anchor UE $110_2$ may include the physCellId in its response to the target UE $110_1$, so that the target UE $110_1$ may not need to retrieve the PhysCellId from its d2d-position-anchor-list.

Example of the "PositioningPairDeviceSuccess" message may be embedded into LTE standard TS 36.355, section 6.5.1.1 and include the below:

```
--ASN1START
positioningPairDeviceSuccess::=SEQUENCE{
    device              INTEGER (0...503)
    prsType             ENUMERATED         OPTIONAL,   -- Cond PRS
    ...,
}
--ASN1START
```

In block 404, the I/O device 303 or other device of target UE $110_1$ may measure the delta position for UE $110_1$ with respect to the anchor UE $110_2$ via the method such as light focus method and sonar. In block 405, the control module 302 or other device of the target UE $110_1$ may collect the position information related to the anchor UE $110_2$ from the communication module 301 (e.g., PhysCellId and DeviceID) and the delta position from the I/O device 303 measured via the method such as light focus method and sonar. The control module 302 or other device may further generate the position report for the target UE $110_1$ based on the position information of the anchor UE $110_2$ and the delta position between the target UE $110_1$ and $110_2$. The position report for the target UE $110_1$ may help the serving eNB 113 and/or LBS sever 124 to obtain the position of the target UE $110_1$ by adding the position of anchor UE $110_2$ to the delta position between the target UE $110_1$ and the anchor UE $110_2$. In block 406, the communication module or other device of the target UE $110_1$ (e.g., RRC layer 3012) may further transmit the relative position for the target UE $110_1$ to the serving eNB 113.

It should be understood that other technologies may implement other embodiments for the method of FIG. 4. For example, it may be other layers rather than the RRC layer 3012 of the target UE $110_1$ to receive or transmit signaling and data from or to the anchor UE $110_2$. Similarly, it may be other layers rather than the RRC layer 3112 of the anchor UE $110_2$ to receive or transmit signaling and data from or to the target UE $110_1$.

Figure 5:
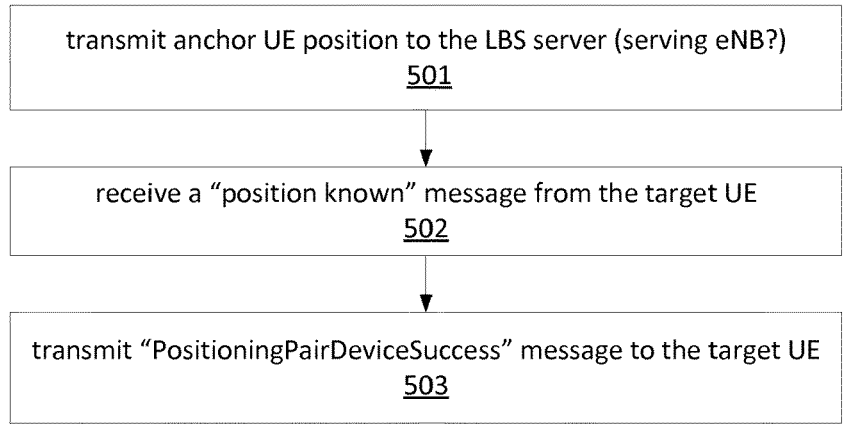
FIG. 5 schematically illustrates a method of measuring the position of the target UE implemented by the anchor UE, in accordance with various embodiments.

FIG. 5 schematically illustrates a method of measuring the position of the target UE implemented by the anchor UE, in accordance with various embodiments.

In block 501, the communication module or other device of the anchor UE $110_2$ may transmit its position information to the LBS 124, such as the position indication (e.g., the phyCellId, deviceId and prsType information related to the anchor UE $110_2$). In block 502, the communication module 311 or other device of the anchor UE 1102 may receive the request message from the target UE $110_1$, which message may inquire the anchor UEs $110_2$-$110_5$ about whether their position information is known to the target UE $110_1$. For example, the request message may be referred as the "position-known" message. In block 503, the communication module 311 or other device of the anchor UE $110_2$ may transmit a response to the request to the target UE $110_1$. For example, the response may be embodied as the "PositioningPairDeviceSuccess" message including device information related to the anchor UE $110_2$, such as the deviceId of the anchor UE $110_2$, prsType specifying the positioning reference signal type which is feasible for the positioning measurement between the target UE and the anchor UE, and/or others (such as D2D measurement, LTE measurement, etc.).

Figure 6:
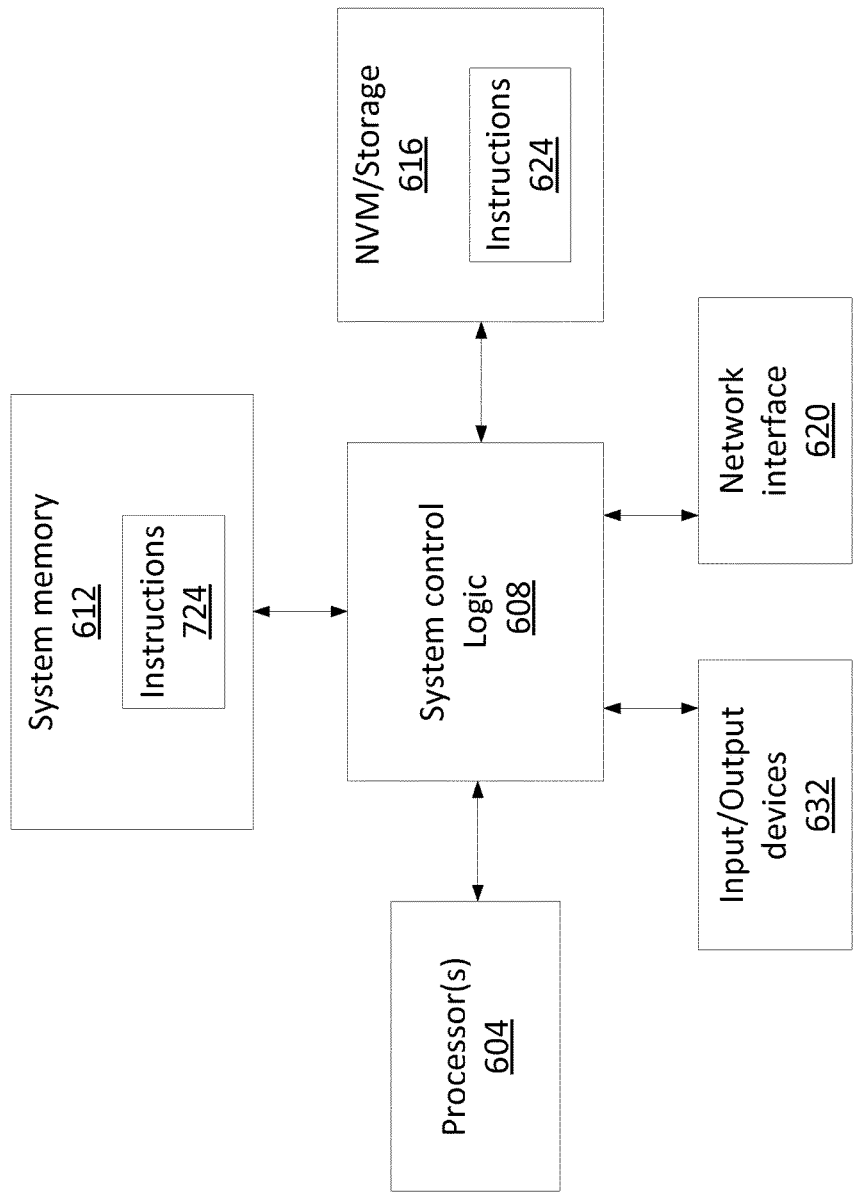
FIG. 6 schematically illustrates an example system in accordance with various embodiments.

FIG. 6 schematically illustrates an example system in accordance with various embodiments.

In an embodiment, the system 600 may comprise one or more processor(s) 604, system control logic 608 coupled with at least one of the processor(s) 604, system memory 612 coupled with system control logic 608, non-volatile memory (NVM)/storage 616 coupled with system control logic 608, and a network interface 620 coupled with system control logic 608.

Processor(s) 604 may include one or more single-core or multi-core processors. Processor(s) 604 may include any combination of general-purpose processors and dedicated processors (e.g., graphics processors, application processors, baseband processors, etc.). In an embodiment in which the system 600 implements the target UE $110_1$, processors(s) 604 may be configured to execute one or more embodiment(s) as illustrated in FIGS. 1-4 in accordance with various embodiments. In an embodiment in which the system 600 implements the anchor UE $110_1$, processors(s) 604 may be configured to execute one or more embodiment(s) as illustrated in FIGS. 1-3 and FIG. 5 in accordance with various embodiments.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620.

System memory 612 and NVM/storage 616 may respectively include, in particular, temporal and persistent copies of instructions 624. Instructions 624 may include instructions that when executed by at least one of the processor(s) 604 result in the system 600 implementing the method as described with reference to FIG. 4 or 5. In various embodiments, instructions 624, or hardware, firmware, and/or software components thereof, may additionally/alternatively be located in the system control logic 608, the network interface 620, and/or the processor(s) 604.

Network interface 620 may include a radio frequency module (RF module), a baseband module, a LTE module, a WiFi module, and so on to provide a radio interface for system 600 to communicate over one or more network(s) and/or with any other suitable device. In various embodiments, the network interface 620 may be integrated with other components of system 600. For example, the network interface may include a processor of the processor(s) 604, memory of the system memory 612, NVM/Storage of NVM/Storage 616, and/or a firmware device (not being illustrated) having instructions that when executed by at least one of the processor(s) 604 result in the system 600 implementing the method as described with reference to FIG. 4 or 5.

Network interface 620 may further include any suitable hardware and/or firmware, such as a plurality of antennas to provide a multiple input, multiple output radio interface. Network interface 620 for one embodiment may be, for example, a network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

The system 600 may further include input/output (I/O) devices 632. The I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

The disclosure may include various example embodiments disclosed below.

In example embodiment 1, a method, employed by a target user equipment (UE) in a wireless network may comprise receiving a first message from a device in the wireless network, wherein the first message includes position information related to one or more anchor UEs; transmitting a second message to the anchor UEs in the wireless network, wherein the second message includes an inquiry about whether a position of at least one of the anchor UEs is knowable to the target UE; and receiving a third message from the at least one anchor UE, wherein the third message includes a response to the inquiry indicating that the position of the at least one anchor UE is knowable to the target UE.

In example embodiment 2, the position information according to the example embodiment 1 may comprise relative positions of the anchor UEs, which include a device identifier (deviceID) for each of the anchor UEs, a physical cell identifier (physCellId) for each of one or more serving cells that the anchor UEs are located in, and/or an indicator (prsType) specifying a position reference signal type which is feasible for a position measurement between the target UE and at least one of the anchor UEs.

In example embodiment 3, the first message according to any of the example embodiments 1-2 may include a plurality of d2d-positioning-anchor-lists, each having a device identifier (deviceID) for one of the anchor UEs, a physical cell identifier (phyCellId) for a serving cell that one of the anchor UEs is located, and one indicator about whether a device to device positioning measurement to measure a delta position between the target UE and the anchor UE is feasible (prsType).

In example embodiment 4, the third message according to any of the example embodiments 1-3 may include a device identifier (deviceID) of the anchor UE whose position is knowable to the target UE.

In example embodiment 5, the method according to any of the example embodiments 1-4 may comprise searching for a physical cell identifier (phyCellId) for a serving cell that the anchor UE is located, based on the deviceID received from the anchor UE.

In example embodiment 6, the third message according to any of the example embodiments 1-5 may further comprise a physical cell identifier (phyCellId) for a serving cell that the anchor UE is located.

In example embodiment 7, the method according to any of the example embodiments 1-6 may further comprise measuring a delta position between the target UE and the anchor UE whose position is knowable to the target UE.

In example embodiment 8, the delta position according to the example embodiment 7 may be measured based on a light focus means or sonar.

In example embodiment 9, the device according to any of the example embodiments 1-8 may be a location base service (LBS) server.

In example embodiment 10, the method according to any of the example embodiments 1-9 may comprise generating a relative position for the target UE, based on the position of the anchor UE and the delta position between the target UE and the anchor UE; and transmitting, through a radio resource control (RRC) connection, a fourth message including the relative position to a serving eNB.

In example embodiment 11, the method according to any of the example embodiments 1-10, wherein at least one of the first message, the second message and the third message may be transmitted via a radio resource control (RRC) connection between the target UE and the anchor UE.

In example embodiment 12, the wireless network according to any of the example embodiments 1-11 may comply with Long Term Evolution (LTE) standards of 3rd Generation Partnership Project along with any amendments, updates and/or revisions.

In example embodiment 13, the wireless network according to any of the example embodiments 1-11 may comply with wireless local area networks (WLAN) standards.

In example embodiment 14, a method, employed by an anchor user equipment (UE) in a wireless network, may comprise transmitting a first message to a device in the wireless network, wherein the first message includes position information related to the anchor UE; receiving a second message to a target UE in the wireless network, wherein the second message includes an inquiry about whether a position of the anchor UE is knowable to the target UE; and transmitting a third message from the anchor UE, wherein the third message includes a response to the inquiry indicating that the position of the anchor UE is knowable to the target UE.

In example embodiment 15, the position information according to the example embodiment 14 may comprise a relative position of the anchor UE, which includes a device identifier (deviceID) for the anchor UE, a physical cell identifier (physCellId) for a serving cell that the anchor UE is located in, and/or an indicator (prsType) specifying a position reference signal type which is feasible for a position measurement between the target UE and the anchor UE.

In example embodiment 16, the third message according to any of the example embodiments 14-15 may include a device identifier (deviceID) of the anchor UE and an indicator (prsType) specifying a position reference signal type which is feasible for a position measurement between the target UE and the anchor UE.

In example embodiment 17, the method according to any of the example embodiments 14-16 may further comprise searching for a physical cell identifier (phyCellId) for a serving cell that the anchor UE is located, based on the deviceID received from the anchor UE.

In example embodiment 18, the third message according to any of the example embodiments 14-17 may further include a physical cell identifier (phyCellId) for a serving cell that the anchor UE is located.

In example embodiment 19, the method according to any of the example embodiments 14-18 may further comprise measuring a delta position between the target UE and the anchor UE based on a light focus means or sonar.

In example embodiment 20, the device according to any of the example embodiments 14-19 may be a location base service (LBS) server.

In example embodiment 21, the method according to any of the example embodiments 14-20 may further comprise determine that the position of the anchor UE is knowable to the target UE based on a security factor.

In example embodiment 22, the third message according to any of the example embodiments 14-21, wherein at least one of the first message, the second message and the third message is transmitted via a radio resource control (RRC) connection between the anchor UE and the target UE.

In example embodiment 23, a target user equipment (UE) in a wireless network may comprise a communication module to: receive a first message from a device in the wireless network, wherein the first message includes position information related to one or more anchor UEs; transmit a second message to the anchor UEs in the wireless network, wherein the second message includes an inquiry about whether a position of at least one of the anchor UEs is knowable to the target UE; and receive a third message from the at least one anchor UE, wherein the third message includes a response to the inquiry indicating that the position of the at least one anchor UE is knowable to the target UE.

In example embodiment 24, the position information according to the example embodiment 23 may comprise relative positions of the anchor UEs, which include a device identifier (deviceID) for each of the anchor UEs, a physical cell identifier (physCellId) for each of one or more serving cells that the anchor UEs are located in, and/or an indicator (prsType) specifying a position reference signal type which is feasible for a position measurement between the target UE and at least one of the anchor UEs.

In example embodiment 25, the first message according to any of the example embodiments 23-24 may include a plurality of d2d-positioning-anchor-lists, each having a device identifier (deviceID) for one of the anchor UEs, a physical cell identifier (phyCellId) for a serving cell that one of the anchor UEs is located, and one indicator about whether a device to device positioning measurement to measure a delta position between the target UE and the anchor UE is feasible (prsType).

In example embodiment 26, the third message according to any of the example embodiments 23-25 may include a device identifier (deviceID) of the anchor UE whose position is knowable to the target UE.

In example embodiment 27, the target UE according to any of the example embodiments 23-26 may further comprise: a control module to search for a physical cell identifier (phyCellId) for a serving cell that the anchor UE is located, based on the deviceID received from the anchor UE.

In example embodiment 28, the third message according to any of the example embodiments 23-27 may further include a physical cell identifier (phyCellId) for a serving cell that the anchor UE is located.

In example embodiment 29, the target UE according to any of the example embodiments 23-28 may further comprise an input/output device to measure a delta position between the target UE and the anchor UE whose position is knowable to the target UE.

In example embodiment 30, the delta position according to any of the example embodiments 23-29 may be measured based on a light focus means or sonar.

In example embodiment 31, the device according to any of the example embodiments 23-30 may be a location base service (LBS) server.

In example embodiment 32, the control module according to any of the example embodiments 27-31 may further generate a relative position for the target UE, based on the position of the anchor UE and the delta position between the target UE and the anchor UE; and the communication module is further to transmit, through a radio resource control (RRC) connection, a fourth message including the relative position to a serving eNB.

In example embodiment 33, the wireless network according to any of the example embodiments 23-32 may comply with Long Term Evolution (LTE) standards of 3rd Generation Partnership Project along with any amendments, updates and/or revisions.

In example embodiment 34, the wireless network according to any of the example embodiments 23-33 may comply with wireless local area networks (WLAN) standards.

In example embodiment 35, the anchor UE may comprise a communication module to transmit a first message to a device in the wireless network, wherein the first message includes position information related to the anchor UE; receive a second message to a target UE in the wireless network, wherein the second message includes an inquiry about whether a position of the anchor UE is knowable to the target UE; and transmit a third message from the anchor UE, wherein the third message includes a response to the inquiry indicating that the position of the anchor UE is knowable to the target UE.

In example embodiment 36, the position information in the first message according to the example embodiment 35 may comprise a relative position of the anchor UE, which includes a device identifier (deviceID) for the anchor UE, a physical cell identifier (physCellId) for a serving cell that the anchor UE is located in, and/or an indicator (prsType) specifying a position reference signal type which is feasible for a position measurement between the target UE and the anchor UE.

In example embodiment 37, the third message according to any of the example embodiments 35-36 may include a device identifier (deviceID) of the anchor UE and an indicator (prsType) specifying a position reference signal type which is feasible for a position measurement between the target UE and the anchor UE.

In example embodiment 38, the anchor UE according to any of the example embodiments 35-37 may further comprise a control module to: search for a physical cell identifier (phyCellId) for a serving cell that the anchor UE is located, based on the deviceID received from the anchor UE.

In example embodiment 39, the third message according to any of the example embodiments 35-38 may further include a physical cell identifier (phyCellId) for a serving cell that the anchor UE is located.

In example embodiment 40, the anchor UE according to any of the example embodiments 35-39 may further comprise: an input/output device to measure a delta position between the target UE and the anchor UE based on a light focus means or sonar.

In example embodiment 41, the device according to any of the example embodiments 35-40 may be a location base service (LBS) server.

In example embodiment 42, the control module according to any of the example embodiments 38-41 may further determine that the position of the anchor UE is knowable to the target UE based on a security factor.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. One or more non-transitory, computer-readable media having instructions that, when executed, cause a target user equipment (UE) in a wireless network to:
   receive a first message from a location base server, wherein the first message includes position assistance data that includes an identity of an anchor UE whose position is known to the location base server;
   transmit a second message to the anchor UE in the wireless network, wherein the second message includes an inquiry about whether a position of the anchor UE is knowable to the target UE;
   receive a third message from the anchor UE, wherein the third message includes a response to the inquiry indicating that the position of the anchor UE is knowable to the target UE; and
   perform a positioning measurement based on the third message.

2. The one or more non-transitory, computer-readable media of claim 1, wherein the identity is a device identifier and the position assistance data in the first message further comprises a physical cell identifier (physCellId) for each of a serving cell in which the anchor UE is located; and an indicator (prsType) to specify a position reference signal type that is feasible for a position measurement between the target UE and the anchor UE.

3. The one or more non-transitory, computer-readable media of claim 1, wherein the first message includes a plurality of d2d-positioning-anchor-lists, each having a device identifier (deviceID) for one of a plurality of anchor UEs, a physical cell identifier (phyCellId) for a serving cell in which one of the plurality of anchor UEs is located, and one indicator about whether a device-to-device positioning measurement to measure a delta position between the target UE and a respective one of the plurality of anchor UEs is feasible (prsType).

4. The one or more non-transitory, computer-readable media of claim 1, wherein the identity is a device identifier (deviceID) and the instructions, when executed, further cause the target UE to search for a physical cell identifier (phyCellId) for a serving cell in which the anchor UE is located, based on the deviceID.

5. The one or more non-transitory, computer-readable media of claim 1, wherein the positioning measurement is a measurement of relative positioning of the target UE with respect to the anchor UE, and the instructions, when executed, further cause the target UE to generate a position report based on the positioning measurement to be sent to a serving evolved NodeB (eNB) through a radio resource control (RRC) connection.

6. The one or more non-transitory, computer-readable media of claim 1, wherein to perform the positioning measurement, the target UE is to measure a round trip time of a light wave or sonar wave.

7. The one or more non-transitory, computer-readable media of claim 1, wherein the wireless network complies with Long Term Evolution (LTE) standards of 3rd Generation Partnership Project along with any amendments, updates and/or revisions.

8. The one or more non-transitory, computer-readable media of claim 1, wherein the wireless network complies with wireless local area networks (WLAN) standards.

9. An anchor user equipment (UE) in a wireless network, comprising:
   communication circuitry to:
      transmit a first message to a location base server, wherein the first message includes position information related to the anchor UE;
      receive a second message from a target UE in the wireless network, wherein the second message includes an inquiry about whether a position of the anchor UE is knowable to the target UE; and
      transmit a third message from the anchor UE, wherein the third message includes a response to the inquiry indicating that the position of the anchor UE is knowable to the target UE; and
   control circuitry, coupled with the communication circuitry, the control circuitry to determine that the position of the anchor UE is knowable to the target UE based on a security factor.

10. The anchor UE of claim 9, wherein the position information in the first message comprises a relative position of the anchor UE, which includes a device identifier (deviceID) for the anchor UE, a physical cell identifier (physCellId) for a serving cell in which the anchor UE is located, and/or an indicator (prsType) to specify a position reference signal type that is feasible for a position measurement between the target UE and the anchor UE.

11. The anchor UE of claim 9, wherein the third message includes a device identifier (deviceID) of the anchor UE and an indicator (prsType) to specify a position reference signal type that is feasible for a position measurement between the target UE and the anchor UE.

12. The anchor UE of claim 9, wherein the third message further includes a physical cell identifier (phyCellId) for a serving cell in which the anchor UE is located.

13. A target user equipment (UE) in a wireless network, comprising:
   means for receiving a first message from a location base server, wherein the first message includes position assistance data that includes an identity of an anchor UE whose position is known to the location base server;
   means for transmitting a second message to the anchor UE in the wireless network, wherein the second message includes an inquiry about whether a position of the anchor UE is knowable to the target UE; and
   means for receiving a third message from the anchor UE, wherein the third message includes a response to the inquiry indicating that the position of the anchor UE is knowable to the target UE; and
   means for performing a positioning measurement based on the third message.

14. The target UE of claim 13, wherein the identity is a device identifier (deviceID) and the position assistance data in the first message further comprises a physical cell identifier (physCellId) for a serving cell in which the anchor UE is located, and an indicator (prsType) to specify a position reference signal type that is feasible for a position measurement between the target UE and the anchor UE.

15. The target UE of claim 13, wherein the third message includes a device identifier (deviceID) of the anchor UE whose position is knowable to the target UE.

16. The target UE of claim 13, further comprising:
means for searching for a physical cell identifier (phyCellId) for a serving cell in which the anchor UE is located, based on the identity received in the first message.

17. The target UE of claim 13,
wherein means for performing the positioning measurement comprises means for measuring a delta position between the target UE and the anchor UE whose position is knowable to the target UE and the target UE further comprises:
means for generating a position report for the target UE, based on the position assistance data of the anchor UE and the delta position between the target UE and the anchor UE; and
means for transmitting, through a radio resource control (RRC) connection, a fourth message including the position report to a serving evolved NodeB (eNB).

18. The target UE of claim 13, wherein the wireless network complies with Long Term Evolution (LTE) standards of 3rd Generation Partnership Project along with any amendments, updates and/or revisions.

19. The target UE of claim 13, wherein the wireless network complies with wireless local area networks (WLAN) standards.

* * * * *